(12) United States Patent
Cyrille et al.

(10) Patent No.: US 7,199,986 B2
(45) Date of Patent: Apr. 3, 2007

(54) MAGNETORESISTIVE SENSOR WITH DECOUPLED HARD BIAS MULTILAYERS

(75) Inventors: Marie-Claire Cyrille, San Jose, CA (US); Meng Ding, Mountian View, CA (US); Kuok-San Ho, Santa Clara, CA (US); Prakash Kasiraj, San Jose, CA (US); Ernesto Marinero, Saratoga, CA (US); James Lamar Nix, Gilroy, CA (US); Brian York, San Jose, CA (US)

(73) Assignee: Hitachi Global Storage Technologies, Amsterdam (NL)

( * ) Notice: Subject to any disclaimer, the term of this patent is extended or adjusted under 35 U.S.C. 154(b) by 456 days.

(21) Appl. No.: 10/782,301

(22) Filed: Feb. 18, 2004

(65) Prior Publication Data

US 2005/0180064 A1 Aug. 18, 2005

(51) Int. Cl.
*G11B 5/33* (2006.01)

(52) U.S. Cl. ..................................... 360/327

(58) Field of Classification Search ............... None
See application file for complete search history.

(56) References Cited

U.S. PATENT DOCUMENTS

| 5,434,826 | A | 7/1995 | Ravipati et al. ............. 367/140 |
| 6,266,218 | B1 | 7/2001 | Carey et al. ............ 360/324.12 |
| 6,351,357 | B1 | 2/2002 | Xue et al. ............... 360/327.31 |
| 6,495,275 | B2 * | 12/2002 | Kamiguchi et al. .... 360/324.11 |
| 6,862,158 | B2 * | 3/2005 | Hasegawa et al. ..... 360/324.11 |
| 2001/0033466 | A1 * | 10/2001 | Oshima et al. ........ 360/324.12 |
| 2002/0024781 | A1 * | 2/2002 | Ooshima et al. ....... 360/324.12 |
| 2005/0068688 | A1 * | 3/2005 | Sbiaa et al. .............. 360/324.1 |
| 2005/0214584 | A1 * | 9/2005 | Takahashi et al. .......... 428/828 |
| 2006/0119356 | A1 * | 6/2006 | Rabe et al. .................. 324/252 |

* cited by examiner

*Primary Examiner*—Allen Cao
(74) *Attorney, Agent, or Firm*—Bracewell & Giuliani LLP

(57) ABSTRACT

A magnetic sensor is provided, having two bias layers separated by a decoupling layer to eliminate exchange coupling between the bias layers. The two bias layers may have differing coercivities, such that the biases provided by the bias layers to the free layer are independently adjustable. The grain structures of the two bias layers may be substantially decorrelated by the decoupling layer.

20 Claims, 4 Drawing Sheets

MAGNETORESISTIVE SENSOR WITH DECOUPLED HARD BIAS MULTILAYERS

FIELD OF THE INVENTION

This invention relates to magnetic sensors for disk drives, and more particularly to magnetic biasing of a free layer of a magnetic sensor.

BACKGROUND

Thin film magnetoresistive sensors or heads have been used in magnetic storage devices (e.g., disk drives) for several years. Such a sensor includes a layer of magnetoresistive material which is conventionally referred to as the free layer. The electrical resistivity of the free layer changes in response to an external magnetic field. Thus, magnetically recorded information is detected by sensing electrical resistivity changes in the free layer.

The free layer is typically a ferromagnetic material having a low coercivity, such as a NiFe, CoFe or NiCoFe alloy, so that its magnetization (also referred to as magnetic moment) can change easily in response to changes in the external magnetic field being sensed. In addition, it is highly desirable that the free layer be in a single magnetic domain state. If multiple magnetic domains, or vortex domain states, are present within the free layer, sensor performance will be degraded due to Barkhausen jumps and other undesirable magnetic domain motion and reorientation phenomena induced by the external magnetic fields to be sensed.

In order to ensure the free layer remains in a single magnetic domain state, a magnetic bias for the free layer is typically provided by bias structures adjacent to the free layer. These bias structures are usually made of hard (i.e., high coercivity and high magnetic moment) ferromagnetic materials, such as CoPt, and CoCrX alloys. Here X can be Pt, Ta, Ni or other elements.

FIG. 1 shows a typical bias configuration for a magnetic sensor free layer. A free layer 10 is biased by bias layers 12 and 14. Magnetizations 18 and 20 of bias layers 12 and 14 are typically set by application of a biasing magnetic field to the entire structure including layers 10, 12, and 14 at a relatively late stage of assembly. The biasing magnetic field has a field strength exceeding the coercivity of bias layers 12 and 14, so that when the biasing magnetic field is removed, remanent magnetizations 18 and 20 in bias layers 12 and 14 remain. Thus bias layers 12 and 14 act as permanent magnets for biasing free layer 10.

Magnetizations 18 and 20 of bias layers 12 and 14 induce a magnetization 16 in free layer 10. Magnetization 16 can be induced in free layer 10 by the process of magnetic exchange coupling, if free layer 10 is in direct contact with bias layers 12 and 14 (as shown on FIG. 1). Alternatively, magnetization 16 can be induced in free layer 10 by the process of magnetostatic coupling, if free layer 10 is not in direct contact with bias layers 12 and 14. Magnetization 16 should be large enough to ensure that free layer 10 remains in a single-domain state. However, magnetic sensor sensitivity decreases as the magnetic bias increases, so magnetization 16 is typically chosen to provide a suitable margin over the minimum required to force free layer 10 into a single-domain state.

In operation, an electrical current (not shown on FIG. 1) is typically passed through free layer 10 in the Y direction on FIG. 1, so that changes in resistivity of free layer 10 can be monitored. Therefore, magnetization 16 is frequently referred to as a longitudinal magnetization because it is in the same direction as this electric current.

Since magnetization is a vector quantity, having both a magnitude and a direction, magnetizations 16, 18, and 20 are to be understood as Y-components of the magnetizations in the corresponding regions (i.e., 10, 12 and 14 respectively). In practice, it is typically not possible to completely control magnetization direction, and the resulting variability tends to have a significant effect on performance.

FIG. 1 shows a view of layers 10, 12, and 14 as seen looking up from a magnetic recording disk (i.e., the disk is in the X-Y plane of FIG. 1). Furthermore, a track on the disk moves in the X direction on FIG. 1 as the disk rotates. Since the X extent of free layer 10 largely determines the density of information that can be read from the track, reduction of the X extent of free layer 10 is a primary goal as disk drive technology evolves. The other dimensions of free layer 10, and the dimensions of bias layers 12 and 14 also tend to decrease as disk drive technology evolves. For example, typical present day (X, Y, Z) dimensions for free layer 10 are about (3 nm, 100 nm, 100 nm), and typical present day (X, Y, Z) dimensions for bias regions 12 and 14 are about (3–15 nm, 30 nm, 200 nm).

The ever-decreasing dimensions of free layer 10 and bias layers 12 and 14 have led to the appreciation of new problems in small bias layers which are either absent or not as apparent in larger structures. One such problem is statistical variability in performance due to crystal grain structure and orientation within bias layers 12 and 14. This leads to variations of the magnetization direction of the individual grains comprising the bias layers 12 and 14.

FIG. 2 shows crystal grains 13a, 13b, 13c, and 13d within bias layer 12 of FIG. 1, and also shows crystal grains 15a, 15b, 15c, and 15d within bias layer 14 of FIG. 1. Crystal grains 13a–d have corresponding magnetizations (Y-components) 18a–d, and crystal grains 15a–d have corresponding magnetizations (Y-components) 20a–d. Magnetizations 18a–d and 20a–d typically vary from grain to grain, as indicated by the variable number of arrows within each crystal grain on FIG. 2. More precisely, the variable number of arrows within each crystal grain of FIG. 2 schematically indicate the variable contribution of each grain to longitudinal magnetization 16 of free layer 10. The contributions of the grains to magnetization 16 can vary due to a variable magnitude and/or direction of magnetization within the grains.

The main reason for variability of magnetizations 18a–d and 20a–d is that materials typically used for bias regions 12 and 14 are magnetically anisotropic and are typically deposited as polycrystalline films having grains with random orientations. For example, CoPt is easy to magnetize along the crystal c axis, and is more difficult to magnetize in other directions. The larger the angle between the magnetization direction and the crystal c axis, the more difficult CoPt is to magnetize, since all basal plane directions (i.e., directions perpendicular to the c axis) are hard magnetization directions.

On FIG. 1, the growth direction is the +X direction, and materials are typically deposited as layers in the Y-Z plane. Bias layers 12 and 14 are typically formed by deposition techniques, such as sputter deposition or ion beam deposition which do not inherently provide perfect control over crystal grain orientation. Therefore, unless further steps are taken, the grain orientation within bias layers 12 and 14 is entirely random. Methods for reducing the randomness of gain orientation are known, such as deposition of layers 12 and 14 on top of a suitable seed layer (such as Cr or a Cr containing alloy). However, introduction of a seed layer typically does not completely remove the randomness of grain orientation, at least in the Y-Z plane (i.e., the growth plane). For example, in CoPt grown on top of Cr, the c axis of the CoPt grains is constrained to lie within the growth plane by the Cr seed layer, but is random within this plane. This is achieved by lattice matching the atomic spacing of the seed layer to the atomic spacing of a plane including the c-axis of the hard bias layer material.

Thus, with or without the use of a seed layer, when magnetizations 18a–d and 20a–d are set by the biasing magnetic field in this example, remanent magnetizations 18a–d and 20a–d vary depending on the angle between the crystal c axis of grains 13a–d and 15a–d and the direction of the biasing magnetic field (i.e., Y on FIGS. 1 and 2).

The variability of magnetizations 18a–d and 20a–d of FIG. 2 undesirably leads to variability in magnetization 16 in free layer 10. As the number of grains contributing to magnetization 16 decreases, the relative standard deviation (i.e., the standard deviation divided by the mean) of magnetization 16 increases, since an average is effectively being taken over the number of grains which contribute to magnetization 16. Typical grain sizes are no smaller than about 7–10 nm in lateral (i.e., Y-Z plane) extent, since grains which are smaller are known to have undesirably reduced stability. Thus the number of grains in bias layers 12 and 14 decreases as the physical size of bias layers 12 and 14 decreases, thereby undesirably increasing the variability of magnetization 16 in free layer 10.

Variability of magnetization 16 has undesirable consequences in manufacturing. To illustrate, let M0 be the minimum magnetization 16 required to force free layer 10 into a single domain state, and let M be the nominal design magnetization 16. A population of manufactured devices will exhibit a distribution of values for magnetization 16, centered on the nominal value M. If M is chosen to be just above M0, then a significant fraction of the population will fail due to insufficient magnetization 16. If M is chosen such that relatively few members of the population fail due to insufficient magnetization 16, then many members of the population will have unnecessarily reduced sensitivity due to magnetization 16 being substantially higher than is required.

FIG. 3 shows another known configuration, as taught in U.S. Pat. No. 5,434,826, for biasing free layer 10 of a magnetic sensor. In the configuration of FIG. 3, bias layers 12a and 12b are separated by an interposing layer 24, and bias layers 14a and 14b are also separated by an interposing layer 24. Magnetizations 18a–b and 20a–b are set within bias layers 12a–b and 14a–b respectively, and cooperatively provide magnetization 16 to free layer 10.

SUMMARY

It is an object of the present invention to reduce the impact of magnetic bias variability on magnetic sensor performance. The present invention provides a magnetic sensor having two bias layers separated by a decoupling layer to eliminate exchange coupling between the bias layers. In one embodiment of the invention, the two bias layers have differing coercivities, such that the biases provided by the bias layers to the free layer are independently adjustable. In another embodiment of the invention, the grain structures of the two bias layers are substantially decorrelated by the decoupling layer.

DETAILED DESCRIPTION

Figure 4:
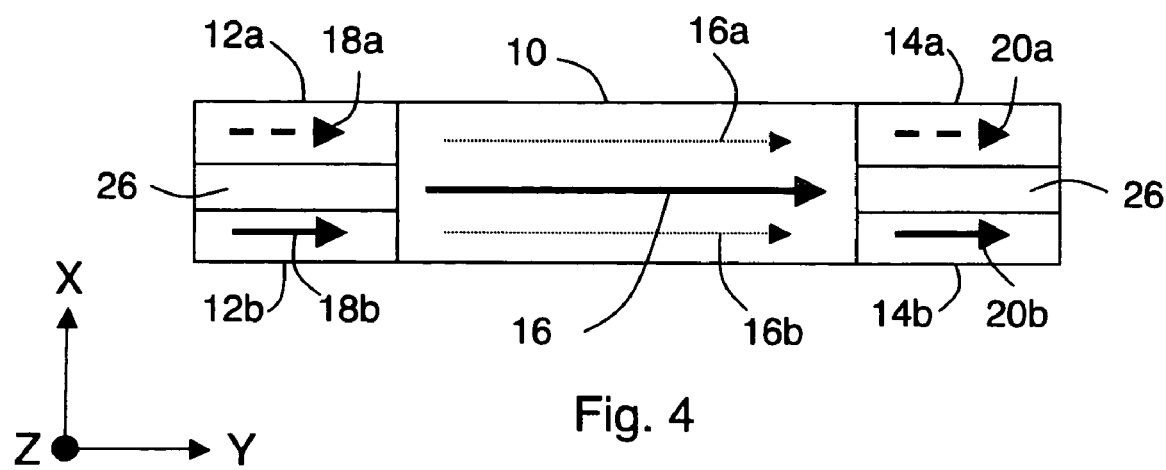
FIG. 4 shows a portion of a magnetic sensor having multilayer bias subassemblies that independently provide biases to the free layer, in accordance with an embodiment of the invention.

FIG. 4 shows a portion of a magnetic sensor having multilayer bias subassemblies that independently provide multiple biases to free layer 10, in accordance with an embodiment of the invention. Bias layers 12a and 12b are separated by a decoupling layer 26. Similarly, bias layers 14a and 14b are separated by a decoupling layer 26. Decoupling layers 26 function to substantially eliminate exchange coupling between layers 12a and 12b (and also between layers 14a and 14b). In addition, the coercivities of layers 12a and 12b differ, as do the coercivities of layers 14a and 14b. Bias layers 12a and 12b, combined with decoupling layer 26, make up a bias subassembly, as do layers 14a, 14b, and 26. Magnetizations 18a and 20a provide a bias 16a to free layer 10, and magnetizations 18b and 20b provide a bias 16b to free layer 10. Magnetization 16 is determined by the combined effect of biases 16a and 16b. Magnetizations 16, 18a–b, and 20a–b are to be understood as Y-components of the magnetizations in the corresponding regions (i.e., 10, 12a–b and 14a–b respectively).

The different coercivities of bias layers 12a and 12b (as well as 14a and 14b), in combination with the decoupling provided by decoupling layers 26, makes biases 16a and 16b independently adjustable. For example, suppose the coercivity of layers 12a and 14a is Hc1 and the coercivity of layers 12b and 14b is Hc2, where Hc2>Hc1. An applied bias magnetic field having a strength greater than Hc2 will alter the remanent magnetization of layers 12a–b and 14a–b, thus altering both biases 16a and 16b. An applied bias magnetic field having a strength less than Hc2 but greater than Hc1 will alter the remanent magnetization of layers 12a and 14a (thus altering bias 16a), but will leave the remanent magnetization of layers 12b and 14b substantially unaltered (so bias 16b is substantially unaltered). Here remanent magnetization is the magnetization remaining when the applied bias magnetic field is removed. Naturally, the independent adjustability of biases 16a and 16b seen in this example is also obtained if Hc2<Hc1.

In order to obtain independent adjustability of biases 16a and 16b in this manner, the minimal condition is that either magnetizations 18a and 18b are independent, or magnetizations 20a and 20b are independent. The embodiment of FIG. 4, where both magnetizations 18a and 18b are independent and magnetizations 20a and 20b are independent is preferred because it provides improved adjustability of biases 16a and 16b.

In the embodiment of FIG. 4, the primary function of decoupling layers 26 is to substantially eliminate exchange coupling between layers 12a and 12b (as well as between layers 14a and 14b). The reason for this is that layers 12a and 12b act substantially as a single magnetic body in the presence of exchange coupling between layers 12a and 12b. For example, magnetizations 18a and 18b may be constrained to be parallel or antiparallel by exchange coupling between layers 12a and 12b. Thus, elimination of such exchange coupling is required to obtain independent adjustability of biases 16a and 16b.

Suitable materials for decoupling layer 26 include: Rhodium (Rh); fcc metals or alloys; bcc metals such as Chromium (Cr), Tantalum (Ta), Molybdenum (Mo), Tungsten (W), or Niobium (Nb); and CrX alloys where X is Molybdenum (Mo), Manganese (Mn), Cobalt (Co), Titanium (Ti), Tantalum (Ta), Vanadium (V), Zirconium (Zr), or Niobium (Nb). Exchange coupling generally tends to decrease as the thickness of decoupling layer 26 increases. Methods for suppressing exchange coupling typically involve use of materials at magnetic interfaces having electronic band structures that do not sustain the presence of a magnetic spin. Therefore, the localized magnetic moments at these interfaces are suppressed, thereby suppressing exchange coupling.

Exchange coupling is a physical phenomenon that is different from magnetostatic interaction. Magnetostatic interaction is the ordinary magnetic interaction between magnetizations 18a and 18b (and also between magnetization 20a and 20b). Magnetostatic interaction is typically not a strong enough effect to force layers 12a and 12b (or layers 14a and 14b) to act substantially as a single magnetic body. Therefore, it is unnecessary for decoupling layers 26 to substantially reduce or eliminate magnetostatic interaction.

Suitable materials for bias layers 12a–b and 14a–b include binary, ternary and quaternary alloys of Co. Binary alloys $Co_xPt_{1-x}$ where $0.5<x<1$ are suitable. CoPt alloys over this composition range exhibit large saturation magnetization values and the magnetocrystalline anisotropy achieves a maximum for compositions with x in a range of about 0.7 to 0.8. Thus, $Co_{0.75}Pt_{0.25}$ alloys are very attractive for producing ultra thin hard bias layers with high remanent magnetization and high bias ratios (magnetization ratio between the hard bias and the free sensor layers). Rhodium is a suitable spacer layer for suppressing exchange coupling between $Co_{0.75}Pt_{0.25}$ layers. In practice, layers 12a–b, 14a–b, 10 and 26 are typically grown within a material growth/deposition system employing ion beam deposition or sputtering techniques. As is known in the art, the material properties of these layers is significantly affected by the growth methodology and therefore to achieve optimum device functionality, the growth of the materials of choice must be optimized in the particular tool employed.

Preferably, decoupling layers 26 act as seed layers that tend to cause the grains within layers 12a to have their easy magnetization directions parallel to the interface between layers 12a and 26 (and similarly for layer 14a). This can be done by lattice matching the atomic spacing of decoupling layer 26 to the atomic spacing of a plane including the c-axis of the material of layer 12a (and of layer 14a).

The independently adjustable biases 16a and 16b provided by the embodiment of FIG. 4 advantageously address the problem of crystal grain induced magnetization variability discussed above. Recall that the net effect of magnetization variability is to oblige a designer to choose between a relatively high design magnetization 16 (thereby reducing sensitivity and improving yield) and a relatively low design magnetization 16 (thereby improving sensitivity and reducing yield).

For example, suppose layers 12a and 14a have coercivity Hc1, and that layers 12b and 14b have coercivity Hc2>Hc1. A designer could select a relatively low design magnetization 16, provided only by bias 16a from magnetizations 18a and 20a. Magnetizations 18a and 20a can be set without substantially altering magnetizations 18b and 20b by application of a bias magnetic field having a strength H1 between Hc1 and Hc2. Since magnetizations 18b and 20b are typically negligible in the as-grown material, and are not altered by this applied bias field, magnetization 16 in free layer 10 is provided only by bias 16a. If magnetizations 18b and 20 are not negligible in as-grown layers 12b and 14b, then these layers can be demagnetized using known methods to render magnetizations 18b and 20b negligible.

A sensor containing this bias structure can be subjected to a pass/fail test to determine if magnetization 16 provided only by bias 16a is sufficiently large to force free layer 10 into a single domain state. For example, one suitable test is measurement of sensor resistance as a slowly varying magnetic field is applied to the disk-facing surface of the sensor. A satisfactory sensor will have a resistance vs. field curve which is continuous and has a continuous derivative, and which exhibits minimal hysteresis over several cycles of the magnetic field. Sensors which pass the test need no further processing. Sensors which fail the test can be subjected for a second time to a biasing magnetic field, where the strength of the biasing field is increased to a value H2 which is greater than Hc2. Such a magnetic field will alter magnetizations 18b and 20b, and after removal of the biasing magnetic field, magnetizations 18b and 20b will provide bias 16b to free layer 10. In this case, biases 16a and 16b both contribute to magnetization 16 in free layer 10.

In many cases, the increased magnetization 16 provided by biases 16a and 16b together (compared to the magnetization provided by bias 16a alone) will suffice to force free layer 10 into a single domain state, thus resulting in a useful sensor. Pass/fail testing as described above is also suitable for making the determination of whether or not the sensor is useful. The net effect of this method is to obtain increased sensor sensitivity (in the fraction of the sensor population which passes the first round of testing) with a reduced yield penalty (since some fraction of the devices which fail the first round of testing are rendered useful by the increased magnetic bias). Of course, the method would work just as well for Hc1<Hc2, and the above description is directly applicable with a and b interchanged.

Although the above method is described in application to a single device, it can also be applied to multiple devices. For example, testing can be done either at the single slider level, or at the row level (where a row contains multiple sliders). Row level testing would typically make use of known statistical sampling techniques to realize the above advantages of increased sensitivity and increased yield while minimizing testing.

Other variations of the above method are possible. For example, biasing magnetic fields having strengths H1 and H2 as indicated above would typically be applied in the Y direction on FIG. 4, to maximize the resulting longitudinal magnetization 16. However, it is also possible to apply biasing magnetic fields having strengths H1 and/or H2 in directions other than the longitudinal direction (i.e. the direction of electric current flow). In this manner, magnetization 16 can be varied by varying biases 16a and/or 16b over a continuous range, thereby providing greater flexibility.

Figure 5:
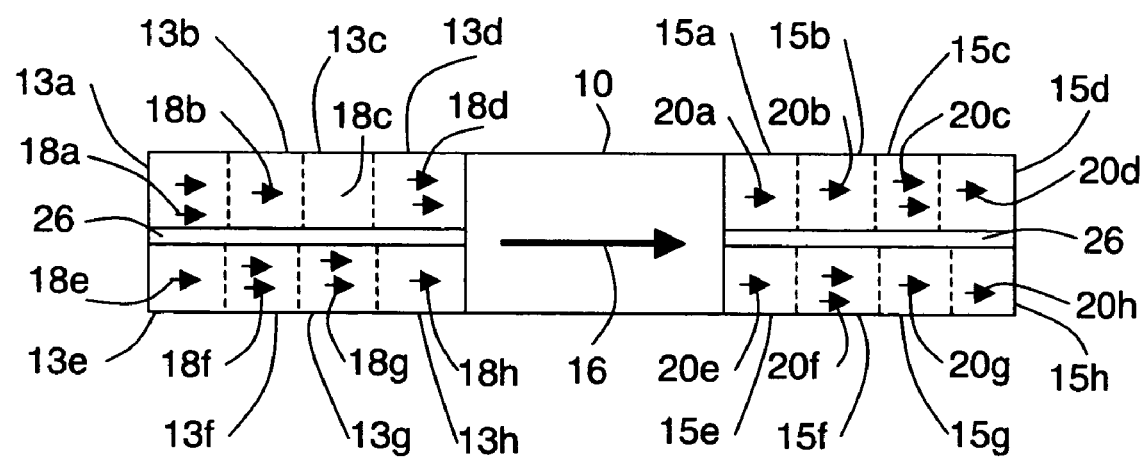
FIG. 5 shows crystal grain structure within a portion of a magnetic sensor in accordance with an embodiment of the invention.

FIG. 5 shows crystal grain structure within a portion of a magnetic sensor in accordance with an embodiment of the invention. In the configuration of FIG. 5, crystal grains 13a–d (corresponding to layer 12a on FIG. 4) have magnetizations (Y-components) 18a–d respectively, and crystal grains 13e–h (corresponding to layer 12b on FIG. 4) have magnetizations (Y-components) 18e–h respectively. Similarly, crystal grains 15a–d (corresponding to layer 14a on FIG. 4) have magnetizations (Y-components) 20a–d respectively, and crystal grains 15e–h (corresponding to layer 14b on FIG. 4) have magnetizations (Y-components) 20e–h respectively. Magnetizations 18a–h and 20a–h are shown on FIG. 5 with a variable number of arrows to indicate the variability of these magnetizations as discussed in connection with FIG. 2. Magnetizations 18a–h and 20a–h provide magnetization 16 in free layer 10.

Figure 1:
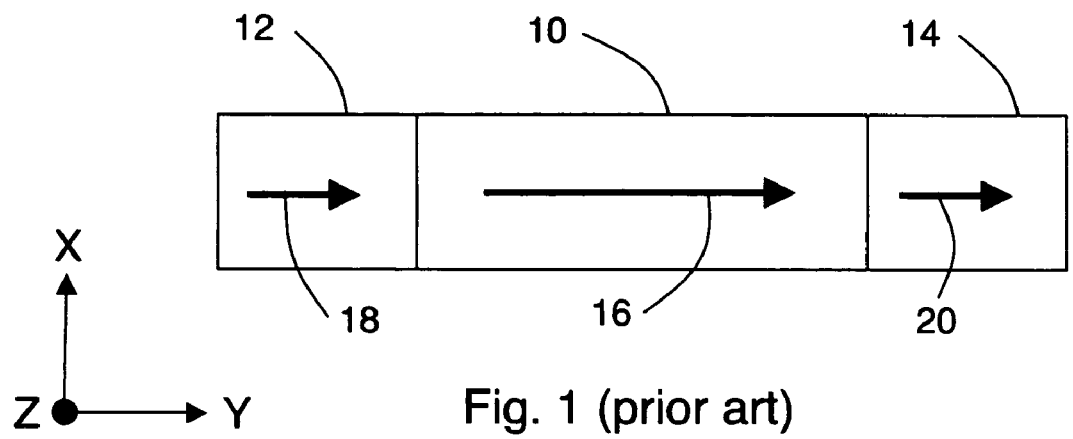
FIG. 1 shows a portion of a prior art magnetic sensor including a free layer and bias structures.
Figure 2:
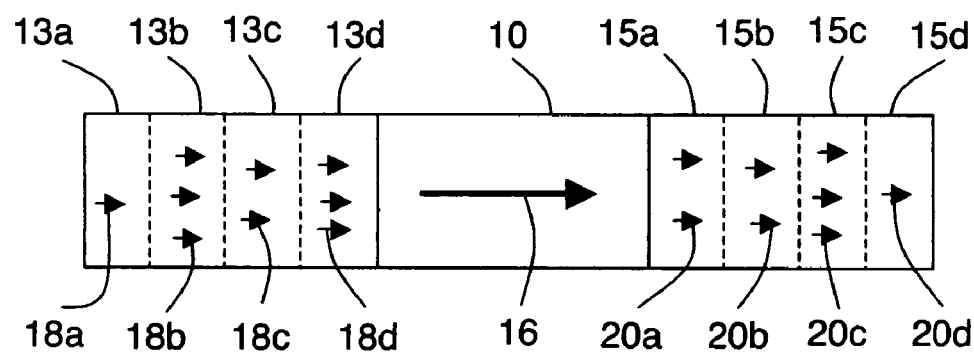
FIG. 2 shows typical crystal grain structure within a portion of a prior art magnetic sensor.
Figure 3:
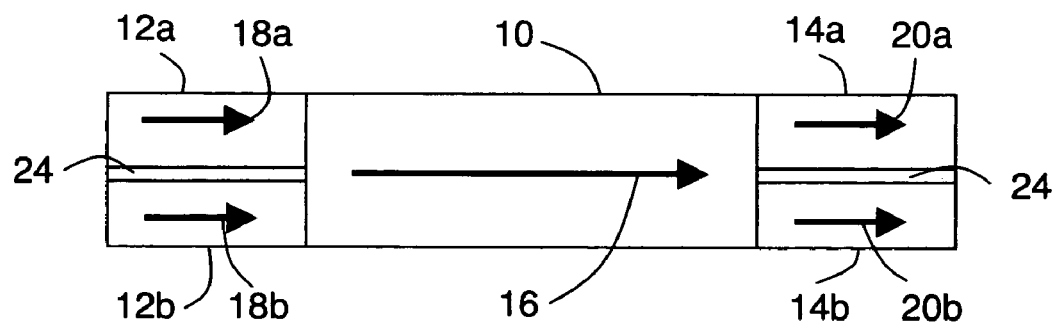
FIG. 3 shows a prior art magnetic sensor having multilayer bias structures that cooperatively provide a bias to the free layer.

Crystal grains 13a–d are separated from crystal grains 13e–h by decoupling layer 26. Likewise, crystal grains 15a–d are separated from crystal grains 15e–h by decoupling layer 26. In the embodiment of FIG. 5, decoupling layer 26 is deposited on top of grains 13e–h and then grains 13a–d are deposited on top of decoupling layer 26. Similarly, decoupling layer 26 is deposited on top of grains 15e–h and then grains 15a–d are deposited on top of decoupling layer 26. One function of decoupling layer 26 is to ensure that grains 13a–d are substantially uncorrelated with grains 13e–h (and that grains 15a–d are substantially uncorrelated with grains 15e–h). In the absence of decoupling layers 26, crystal grains as shown in FIG. 2 would form, since crystal grain growth is typically columnar in the growth direction (X direction on FIGS. 2 and 5). Decoupling layer 26 also substantially eliminates exchange coupling between grains 13a–d and grains 13e–h (and also between grains 15a–d and grains 15e–h).

The configuration of FIG. 5 therefore increases the number of statistically independent grains which contribute to magnetization 16 in free layer 10. As indicated above, this increased number of grains advantageously reduces the variability of magnetization 16. In order to realize the advantages of the embodiment of FIG. 5, it is not necessary for the coercivity of grains 13a–d to differ from the coercivity of grains 13e–h. Differing coercivities are also not required between grains 15a–d and 15e–h. Suitable materials for grains 13a–h and 15a–h and decoupling layer 26 on FIG. 5 are as indicated above in connection with FIG. 4.

Figure 6A:
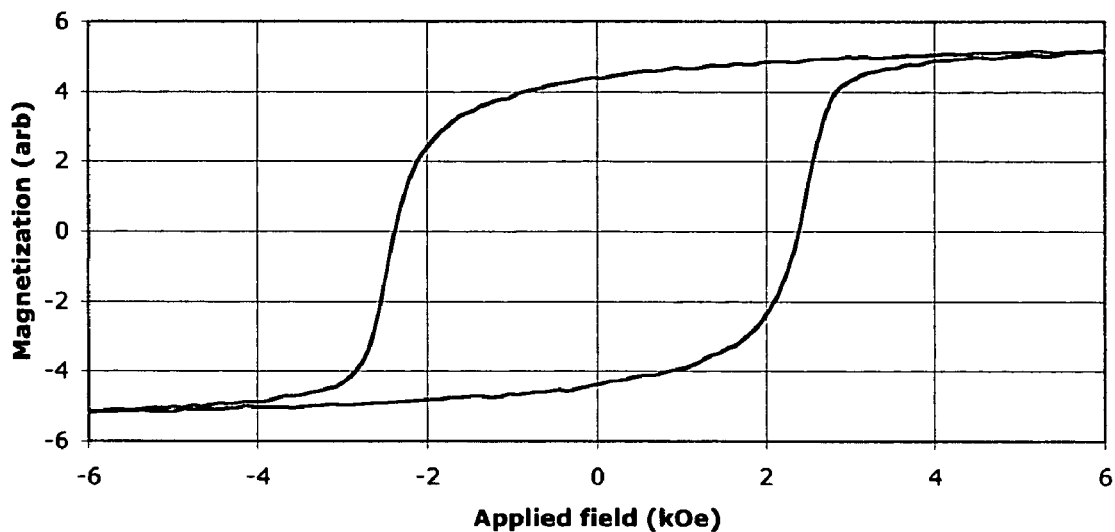
FIGS. 6a–6c show measured hysteresis curves from a multi-layer hard bias structure for several different decoupling layer thicknesses.
Figure 6B:
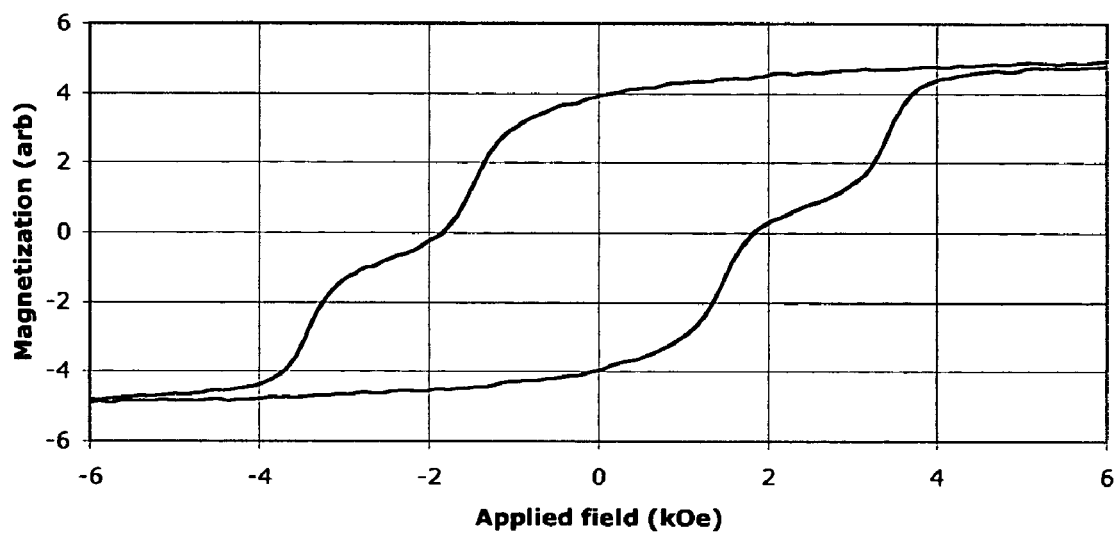
Figure 6C:
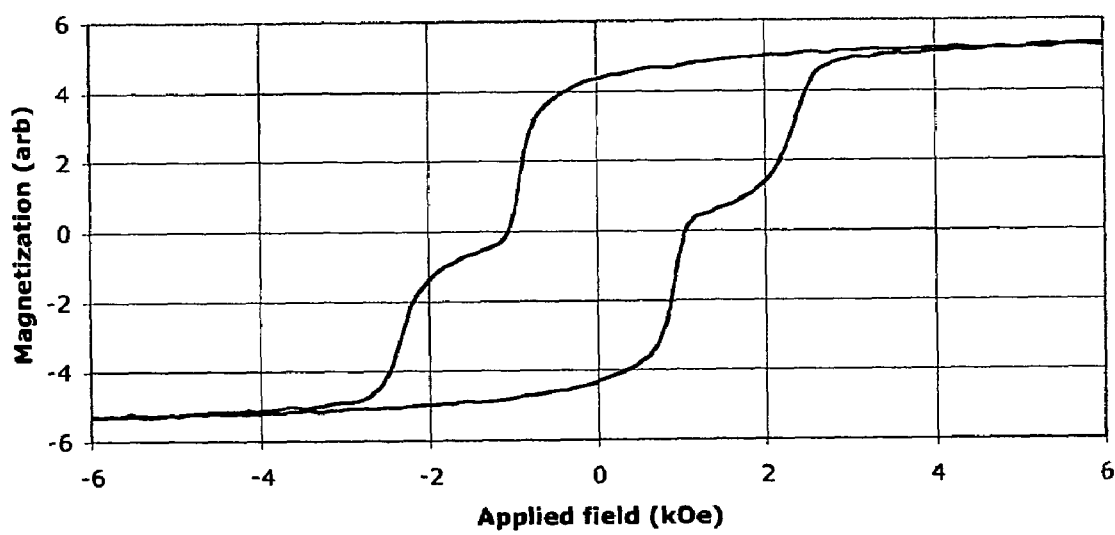

FIGS. 6a–c show measured hysteresis curves from a multi-layer hard bias structure for several different decoupling layer thicknesses. The results of FIGS. 6a–c are obtained from structures where bias layers (12a, 12b, 14a, 14b) are 5 nm thick layers of Co3Pt (i.e., $Co_{0.75}Pt_{0.25}$), and decoupling layer 26 is Rh. The thickness of decoupling layer 26 is 0.3 nm, 1 nm and 8 nm in the examples of FIGS. 6a, 6b, and 6c respectively. As indicated on the titles of the plots in FIGS. 6a–c, the overall layer sequence in these experiments is seed layer (~11 nm of CrMo), first bias layer (Co3Pt), decoupling layer (Rh), second bias layer (Co3Pt), and Ta layer.

FIG. 6a, with a 0.3 nm thick decoupling layer, shows a hysteresis curve that is typical for a single magnetic body, which shows that the two bias layers are strongly exchange coupled. FIG. 6c, with an 8 nm thick decoupling layer, shows a hysteresis curve that is not typical for a single magnetic body. Instead, the structure acts as two independent magnetic bodies, which indicates substantial elimination of exchange coupling. The hysteresis curve shown on FIG. 6c shows that magnetization reversal occurs in two distinct steps, at applied fields of roughly 1 kOe and 2 kOe, which correspond to magnetization reversal in the second and first bias layers respectively. Thus the two bias layers of FIG. 6c have differing coercivities, even though the material composition of the two bias layers is the same. The explanation for these differing coercivities is that the coercivity of a thin layer depends in part on the crystallographic properties (e.g., symmetry, grain size and/or crystal orientation) and thickness of the layer that it is grown upon. The two bias layers in the example of FIG. 6c are grown on different materials belonging to different crystallographic groups (i.e., CrMo is bcc, and Rh is fcc) and having different thicknesses (i.e., CrMo seed thickness is ~11 nm and Rh decoupling layer thickness is 0.3 nm). FIG. 6b, with a 1 nm thick decoupling layer, shows behavior intermediate to that of FIGS. 6a and 6c.

Thus the condition of differing coercivities of bias layers 12a and 12b (and of 14a and 14b) relating to the embodiment of FIG. 4 can be obtained even if layers 12a and 12b (and/or layers 14a and 14b) have the same material composition.

The invention has now been described in accordance with several exemplary embodiments, which are illustrative, rather than restrictive. Thus, the invention is capable of many variations in detailed implementation, which may be derived from the description contained herein by a person of ordinary skill in the art. For example, the above embodiments relate to decoupling of two bias layers, but three or more bias layers can also be decoupled according to the invention.

What is claimed is:

1. A magnetoresistive sensor comprising:
a magnetoresistive free layer;
a first ferromagnetic bias layer providing a first bias to the free layer;
a second ferromagnetic bias layer providing a second bias to the free layer; and
a decoupling layer disposed between the first and second bias layers to substantially eliminate exchange coupling between the first and second bias layers; and
the first bias layer includes a first plurality of crystal grains and the second bias layer includes a second plurality of crystal grains substantially uncorrelated with the first plurality.

2. The sensor of claim 1, wherein said first bias layer has a coercivity Hc1 and said second bias layer has a coercivity Hc2 greater than Hc1.

3. The sensor of claim 2, wherein said first and second bias layers comprise first and second materials respectively, and wherein said first and second materials differ.

4. The sensor of claim 2, wherein said first and second bias layers comprise first and second materials respectively, and wherein said first and second materials are the same.

5. The sensor of claim 2, wherein said first and second biases are independently adjustable by application of an external magnetic field.

6. The sensor of claim 1, wherein said second bias layer is deposited on top of said decoupling layer, and wherein an easy magnetization direction of said second bias layer is constrained, by said decoupling layer, to be parallel to an interface between said decoupling layer and said second bias layer.

7. The sensor of claim 1, wherein said decoupling layer comprises a bcc metal.

8. The sensor of claim 1, wherein said decoupling layer comprises of fcc metal.

9. The sensor of claim 1, wherein said decoupling layer comprises a CrX alloy, where X is Mo, Mn, Co, Ti, Ta, V, Zr, or Nb.

10. The sensor of claim 1, wherein said first bias layer comprises a first binary, ternary or quaternary alloy of Co, and wherein said second bias layer comprises a second binary, ternary or quaternary alloy of Co.

11. The sensor of claim 10, wherein said first alloy comprises $Co_xPt_{1-x}$ where $0.5<x<1$, and wherein said second alloy comprises $Co_yPt_{1-y}$ where $0.5<y<1$.

12. A magnetoresistive sensor comprising:
a magnetoresistive free layer;
a first ferromagnetic bias layer providing a first bias to the free layer;
a second ferromagnetic bias layer providing a second bias to the free layer; and
a decoupling layer disposed between the first and second bias layers to substantially eliminate exchange coupling between the first and second bias layers; and
the second bias layer is deposited on top of the decoupling layer, and an easy magnetization direction of the second bias layer is constrained, by the decoupling layer, to be parallel to an interface between the decoupling layer and the second bias layer.

13. The sensor of claim 12, wherein the first bias layer has a coercivity Hc1 and the second bias layer has a coercivity Hc2 greater than Hc1.

14. The sensor of claim 13, wherein the first and second bias layers comprise first and second materials respectively, and wherein the first and second materials differ.

15. The sensor of claim 13, wherein the first and second bias layers comprise first and second materials respectively, and wherein the first and second materials are the same.

16. The sensor of claim 13, wherein the first and second biases are independently adjustable by application of an external magnetic field.

17. The sensor of claim 12, wherein the decoupling layer comprises one of a bcc metal and an fcc metal.

18. The sensor of claim 12, wherein the decoupling layer comprises a CrX alloy, where X is Mo, Mn, Co, Ti, Ta, V, Zr, or Nb.

19. The sensor of claim 12, wherein the first bias layer comprises a first binary, ternary or quaternary alloy of Co, and wherein the second bias layer comprises a second binary, ternary or quaternary alloy of Co.

20. The sensor of claim 19, wherein the first alloy comprises $Co_xPt_{1-x}$ where $0.5<x<1$, and wherein the second alloy comprises $Co_yPt_{1-y}$ where $0.5<y<1$.

* * * * *